(12) United States Patent
Hatfield (10) Patent No.: US 9,514,013 B2
(45) Date of Patent: Dec. 6, 2016

(54) MAINTAINING INACTIVE COPY RELATIONSHIPS FOR SECONDARY STORAGES OF ACTIVE COPY RELATIONSHIPS HAVING A COMMON PRIMARY STORAGE FOR USE IN CASE OF A FAILURE OF THE COMMON PRIMARY STORAGE

(71) Applicant: INTERNATIONAL BUSINESS MACHINES CORPORATION, Armonk, NY (US)

(72) Inventor: Brian D. Hatfield, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 14/318,395

(22) Filed: Jun. 27, 2014

(65) Prior Publication Data
US 2015/0378854 A1 Dec. 31, 2015

(51) Int. Cl.
*G06F 11/00* (2006.01)
*G06F 11/20* (2006.01)

(52) U.S. Cl.
CPC ....... *G06F 11/2058* (2013.01); *G06F 11/2069* (2013.01); *G06F 11/2074* (2013.01); *G06F 11/2082* (2013.01)

(58) Field of Classification Search
CPC .............. G06F 11/2064; G06F 11/1662; G06F 11/2058; G06F 11/2092
See application file for complete search history.

(56) References Cited

U.S. PATENT DOCUMENTS

| 6,035,412 | A | 3/2000 | Tamer et al. |
| 6,578,120 | B1 | 6/2003 | Crockett et al. |
| 7,461,226 | B2 * | 12/2008 | Iwamura ............ G06F 11/2058 707/999.202 |
| 7,716,518 | B2 | 5/2010 | Butterworth et al. |
| 7,788,225 | B2 | 8/2010 | Fish et al. |

(Continued)

OTHER PUBLICATIONS

Y.C. Lien, et al., "Method for Creating Consistent Bitmaps", IBM Corporation, IP.com, Jul. 1, 1990, TDB n2, Jul. 1990, p. 417-421, IP.com No. IPCOM000101300D, electronic publication Mar. 16, 2005.
U.S. Appl. No. 14/788,539, filed Jun. 30, 2015.
U.S. Appl. No. 14/788,379, filed Jun. 30, 2015.

(Continued)

*Primary Examiner* — Philip Guyton
(74) *Attorney, Agent, or Firm* — David W. Victor; Konrad Raynes Davda & Victor LLP (57) ABSTRACT

Provided are a computer program product, system, and method for maintaining inactive copy relationships for secondary storages of active copy relationships having a common primary storage for use in case of a failure of the common primary storage. A plurality of active copy relationships are established, each having a common primary storage and one of a plurality of secondary storages. For each possible pair of secondary storages in the active copy relationships, an inactive copy relationship is established to copy data from a first of the secondary storages in the pair to a second of the secondary storages in the pair. In response to a failure of the common primary storage in the active copy relationship, a new active copy relationship is established having a primary and secondary storages from a selected one of the inactive copy relationships.

26 Claims, 8 Drawing Sheets

(56) References Cited

U.S. PATENT DOCUMENTS

| | | | |
|---|---|---|---|
| 7,895,162 B2 | 2/2011 | Tanaka et al. | |
| 7,979,897 B2 | 7/2011 | Klein et al. | |
| 8,161,256 B2 | 4/2012 | Hara et al. | |
| 8,667,033 B1 | 3/2014 | McCline et al. | |
| 2005/0050288 A1* | 3/2005 | Takahashi | G06F 3/061 711/162 |
| 2006/0143497 A1* | 6/2006 | Zohar | G06F 11/2058 714/6.23 |
| 2007/0050547 A1* | 3/2007 | Sano | G06F 11/2082 711/114 |
| 2008/0022058 A1* | 1/2008 | Nadathur | G06F 11/1458 711/162 |
| 2014/0108345 A1 | 4/2014 | Brown et al. | |
| 2014/0156595 A1 | 6/2014 | Rose et al. | |

OTHER PUBLICATIONS

"Recovery Scenario using Incremental Resynchronization in a Metro/Global Mirror Configuration", IBM Corporation, [online] [retrived Apr. 25, 2015] http://www-01.ibm.com/support/knowledgecenter/api/content/nl/en-us/ . . . , pp. 12.

"Recovery Scenarios for Metro/Global Mirror with Incremental Resync", IBM Corporation, [online] [retrived Apr. 25, 2015] http://www-01.ibm.com/support/knowledgecenter/api/content/nl/en-us/ . . . , pp. 3.

D. Clitherow, "GDPS Family an Introduction to Concepts and Capabilities", IBM Corporation, Document SG24-6374-09, Aug. 2014, pp. 324.

List of Patents or Patent Applications That Are Related, dated Jul. 1, 2015, pp. 2.

U.S. Appl. No. 15/094,051, filed Apr. 8, 2016.

List of IBM Patents or Patent Applications Treated as Related dated Apr. 12, 2016, pp. 2.

\* cited by examiner

FIG. 1

Active Copy Relationship

FIG. 2

Inactive Copy Relationship

MAINTAINING INACTIVE COPY RELATIONSHIPS FOR SECONDARY STORAGES OF ACTIVE COPY RELATIONSHIPS HAVING A COMMON PRIMARY STORAGE FOR USE IN CASE OF A FAILURE OF THE COMMON PRIMARY STORAGE

BACKGROUND OF THE INVENTION

1. Field of the Invention

The present invention relates to a computer program product, system, and method for maintaining inactive copy relationships for secondary storages of active copy relationships having a common primary storage for use in case of a failure of the common primary storage.

2. Description of the Related Art

In a storage environment, a storage controller may maintain mirror copy relationships, where a primary volume in a mirror copy relationship comprises the storage or volumes from which data is physically copied to a secondary or volume. Failover programs, such as International Business Machine Corporation's ("IBM") HyperSwap® which is a function in the z/OS® operating system, provides continuous availability for disk failures by maintaining the mirror copy relationships to provide synchronous copies of all primary disk volumes on one or more primary storage systems to one or more target (or secondary) storage systems. (HyperSwap is a registered trademark of IBM in countries throughout the world). When a disk failure is detected, code in the operating system identifies HyperSwap managed volumes and instead of failing the I/O request, HyperSwap switches (or swaps) information in internal control blocks so that the I/O request is driven against the secondary volume of the mirror copy relationship. Since the secondary volume is an identical copy of the primary volume prior to the failure, the I/O request will succeed with no impact to the program issuing the I/O request, which could be an application program or part of the operating system. This therefore masks the disk failure from the program and avoids an application and/or system outage.

A mirror copy relationship may maintain a current and previous bitmaps to keep track of updates at the primary volume that need to be copied or synchronized to the secondary storage. A previous bitmap, also known as an out-of-synch bitmap, indicates updated data in the primary volume that occurred in a previous interval, or consistency period, and a current bitmap, also known as a change recording bitmap, which indicates updated data in the primary volume that occurred in the current interval or current consistency period. After the replication manager copies all updated data indicated in the previous bitmap, the bitmaps would be toggled to create a new interval, so that the previous bitmap is set to the current bitmap to copy all updated data prior to the new interval, and a new current bitmap would be initialized to record writes in the new interval. In this way, updates that occur while data is being synchronized get recorded without interfering with the synchronization of the writes as of the recent interval.

SUMMARY

Provided are a computer program product, system, and method for maintaining inactive copy relationships for secondary storages of active copy relationships having a common primary storage for use in case of a failure of the common primary storage. A plurality of active copy relationships are established, each having a common primary storage and one of a plurality of secondary storages. For each possible pair of secondary storages in the active copy relationships, an inactive copy relationship is established to copy data from a first of the secondary storages in the pair to a second of the secondary storages in the pair. In response to a failure of the common primary storage in the active copy relationship, a new active copy relationship is established having a primary and secondary storages from a selected one of the inactive copy relationships, where the information in the selected inactive copy relationship is used to determine data to synchronize for the new active copy relationship.

DETAILED DESCRIPTION

Described embodiments provide techniques for allowing a failover to secondary storages in active mirror copy relationships having a common primary storage that has failed. Inactive copy relationships are maintained between all possible pairs of the secondary storages and keep track of data units in the primary storage of the inactive copy relationship that have been updated when that same storage has been updated as part of an active copy relationship. In this way, the inactive copy relationships may be used to determine data that needs to be synchronized between a primary and secondary storages in a new active copy relationship because the inactive copy relationship indicates how the primary and secondary storages have been updated when they were secondary storages in the active copy relationships having the failed common primary storage.

Figure 1:
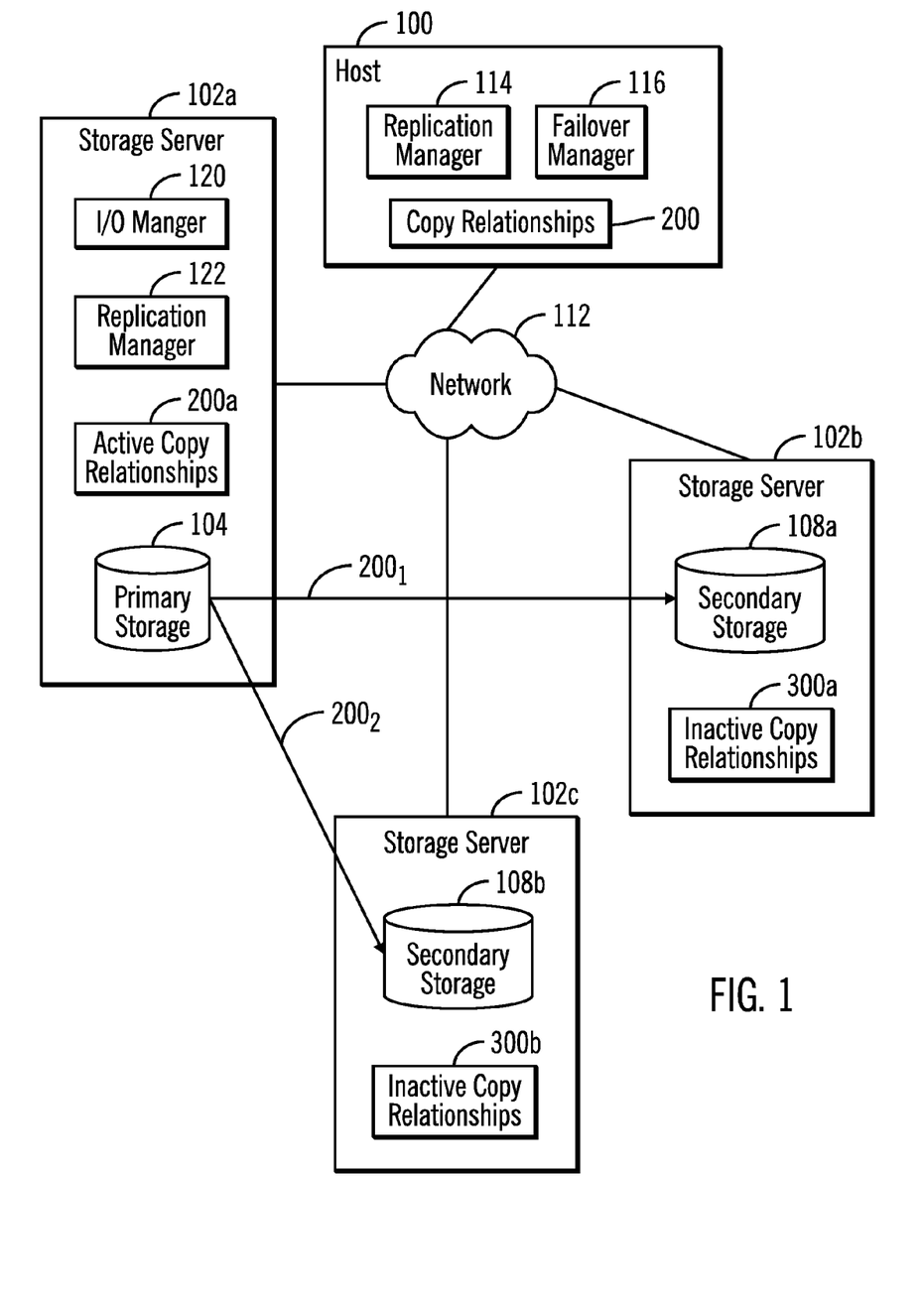
FIG. 1 illustrates an embodiment of a storage replication environment.

FIG. 1 illustrates an embodiment of a replication copy storage environment having a host system 100 that is connected to a plurality of storage servers 102a, 102b, 102c. Storage server 102a manages a primary storage 104 that is copied to multiple secondary storages 108a, 108b in different storage servers 102a, 102b as part of different mirror copy relationships 200₁ and 200₂. In an alternative embodiment, the secondary storages 108a, 108b may all be in one storage server. Still further, there may be more than two mirror copy relationships 200ᵢ having the common primary storage 104 copied to additional secondary storages 108ᵢ that may be located on any number of servers. In a yet further embodiment, all the secondary storages 108a, 108b and the common primary storage 104 may be located on one storage server 102a. The host 100 and storage servers 102a, 102b, 102c may communicate over a network 112. There may be additional hosts (not shown) that provide Input/Output (I/O) requests to the source 104a and target 104b storages.

The host system 100 includes a replication manager 114 to establish mirror copy relationships 200 between the different storages as shown by the copy relationships $200_1$, $200_2$. In each of the active copy relationships 200, data is synchronized or copied from a primary storage to a secondary storage, as shown by the direction of the arrows in the illustrated copy relationships $200_1$ and $200_2$. The host 100 further includes a failover manager 116 to use to implement a failover from a primary storage to a secondary storage in one of the copy relationships $200_1$ and $200_2$.

Further, an inactive copy relationship 300 may be established for each possible ordered pairs of secondary storages in the active copy relationships 200a. For instance, for each possible pair of first and secondary storages in the active copy relationships 200a, there may be two inactive copy relationships, one from the first secondary storage to the second secondary storage of the possible pair and another from the second secondary storage to the first secondary storage of the possible pair. Thus, if there are n copy relationships, there would be n*(n−1) inactive copy relationships established.

In one embodiment, the inactive copy relationship 300a, 300b may be stored on the storage server 102a, 102b including the primary storage of the inactive copy relationship. The inactive copy relationships are used to provide information on the state of data present on possible future relationships that may be used for a new active relationship if the primary storage in the active relationship fails. A new active relationship may be established between two of the secondary storages of the active relationships having the failed common primary storage, where two of the inactive relationships would indicate the synchronization status between those two secondary storages for which the new active relationship will be established.

In one embodiment, the active copy relationships 200a are created by the replication manager 114 in the host 100 and the inactive copy relationships 300a, 300b are created by the replication manager 122 on the storage server 102a having the primary storage 104 of the active copy relationships 200a for which the inactive copy relationships 300a, 300b were created. The inactive copy relationships 300a, 300b may be maintained by the storage servers 102a, 102b having the secondary storages 108a, 108b of the active relationships $200_1$, $200_2$ or may be maintained on the storage server having the primary storage 104.

Each of the storage servers 102a, 102b, 102c may include, as shown with respect to storage server 102a, an I/O manager 120 to manage I/O requests and a replication manager 122 to manage copy relationships 200a, such as copying data written to the primary storage 104 to the secondary storages 108a, 108b. to synchronize data therebetween.

The storage servers 102a, 102b, 102c may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world).

In one embodiment, the replication manager 114, 122 comprises a program for managing the mirroring of volumes across systems, such as, but not limited to, the IBM mirroring programs Geographically Dispersed Parallel Sysplex® (GDPS)®, and Tivoli® Storage Productivity Center for Replication (TPC-R) that define a replication session and copy pairs 200. Different types of techniques may be selected to copy the data, such as synchronous mirroring, asynchronous mirroring or point-in-time copying, or combinations of multiple of these different mirroring types. The failover manager 116 may comprise a program suitable for handling the failover from one of the secondary storages 108a, 108b in one of the active copy relationships $200_1$, $200_2$ to another of the secondary storages 108a, 108b in another active copy relationship $200_1$, $200_2$, such as, but not limited to, the IBM HyperSwap product which establishes failover sessions from the established copy pairs. (Geographically Dispersed Parallel Sysplex, GDPS, Tivoli, and HyperSwap are registered trademarks of IBM in countries throughout the world).

The network 112 may comprise a Storage Area Network (SAN), Local Area Network (LAN), Intranet, the Internet, Wide Area Network (WAN), peer-to-peer network, wireless network, arbitrated loop network, etc. The storages 104, 108a, 108b may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. Then storage devices in which the storages 104, 108a, 108b are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

Figure 2:
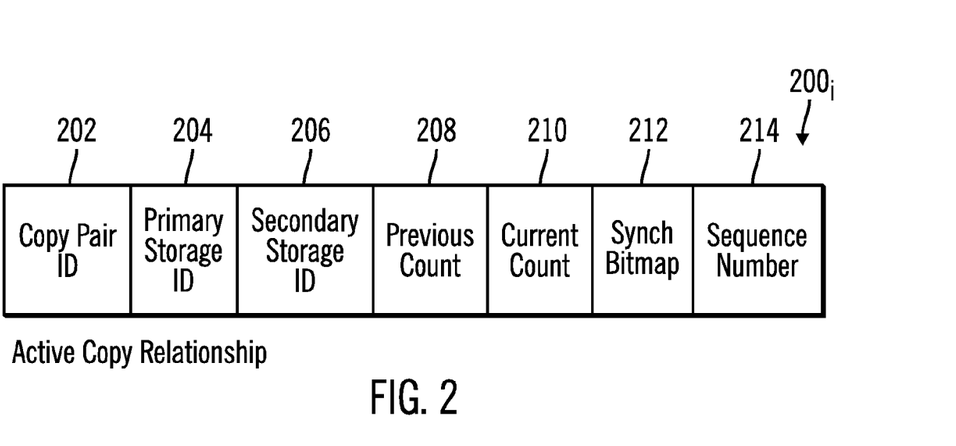
FIG. 2 illustrates an embodiment of an active copy relationship.

FIG. 2 illustrates an embodiment of an instance of a copy relationship $200_i$, e.g., copy relationships $200_1$, $200_2$, which may be included in the copy relationships 200 and 200a, as including a copy pair identifier (ID) 202; a primary storage identifier (ID) 204 of a primary storage from which data is copied; a secondary storage ID 206 of a secondary storage to which data is mirrored; a previous count 208 indicating a number of data units at the primary storage 204 to copy to the secondary storage 206 that were received prior to a current interval, such as when the counts 208, 210 were toggled; a current count 210 indicating a number of data units to copy to the secondary storage 206 that have been received during a current interval; a synch bitmap 212 indicating data units or tracks in the primary storage 204 that need to copied or synchronized to the secondary storage 206; and a sequence number 214 that gets toggled between a first value and a second value when a new interval begins, such that the sequence number 214 indicates a value associated with the current interval and current count 210 and the other possible sequence number value is associated with the previous interval and the previous count 208. When all updates are copied to the secondary storage 206, the copy relationship $200_i$ reaches a duplex or synchronized state. In further embodiments, the possible values for the sequence number 214 may be more than two.

Figure 3:
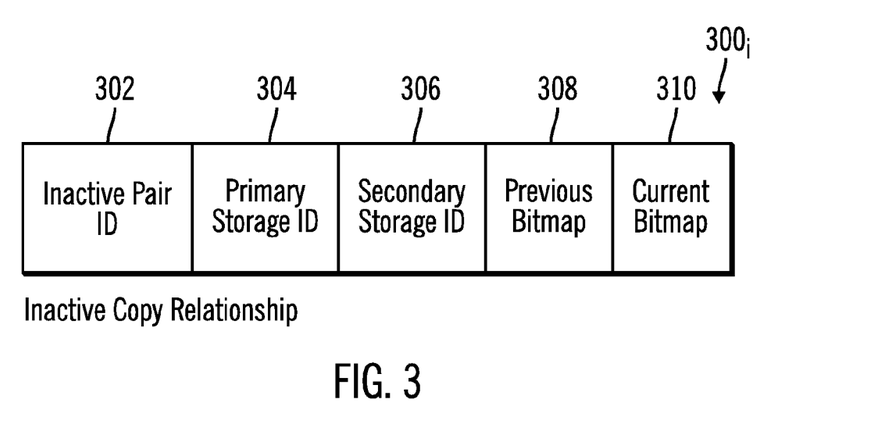
FIG. 3 illustrates an embodiment of an inactive copy relationship.

FIG. 3 illustrates an embodiment of an inactive copy relationship 300i as including an inactive pair ID 302 identifying the inactive copy relationship; a primary storage ID 304 identifying the primary storage of the relationship, comprising one of the secondary storages 306 in the active copy relationships $200_i$; a secondary storage ID 306 identifying a secondary storage to which the primary storage 304 data is copied, comprising another one of the secondary storages 206 in another one of the active copy relationship $200_j$; a previous bitmap 308 indicating data units that need to be copied from the primary storage 304 to the secondary storage 306 that were indicated as needing to be copied in a prior interval, such as ending when the bitmaps 308, 310 were last toggled; and a current bitmap 310 indicating data units that need to be copied from the primary storage 304 to the secondary storage 306 that were indicated as needed to be copied in a current interval following the previous interval.

The bitmaps 212, 308, 310 may comprise an array of cells, where each cell indicates one of the data units subject to the copy relationship. In alternative embodiments, the bitmaps may comprise other types of data structures other than arrays used to indicate data units of the copy relationship that have been updated at the primary storage 204 that need to by synchronized to the secondary storage 206.

Figure 4:
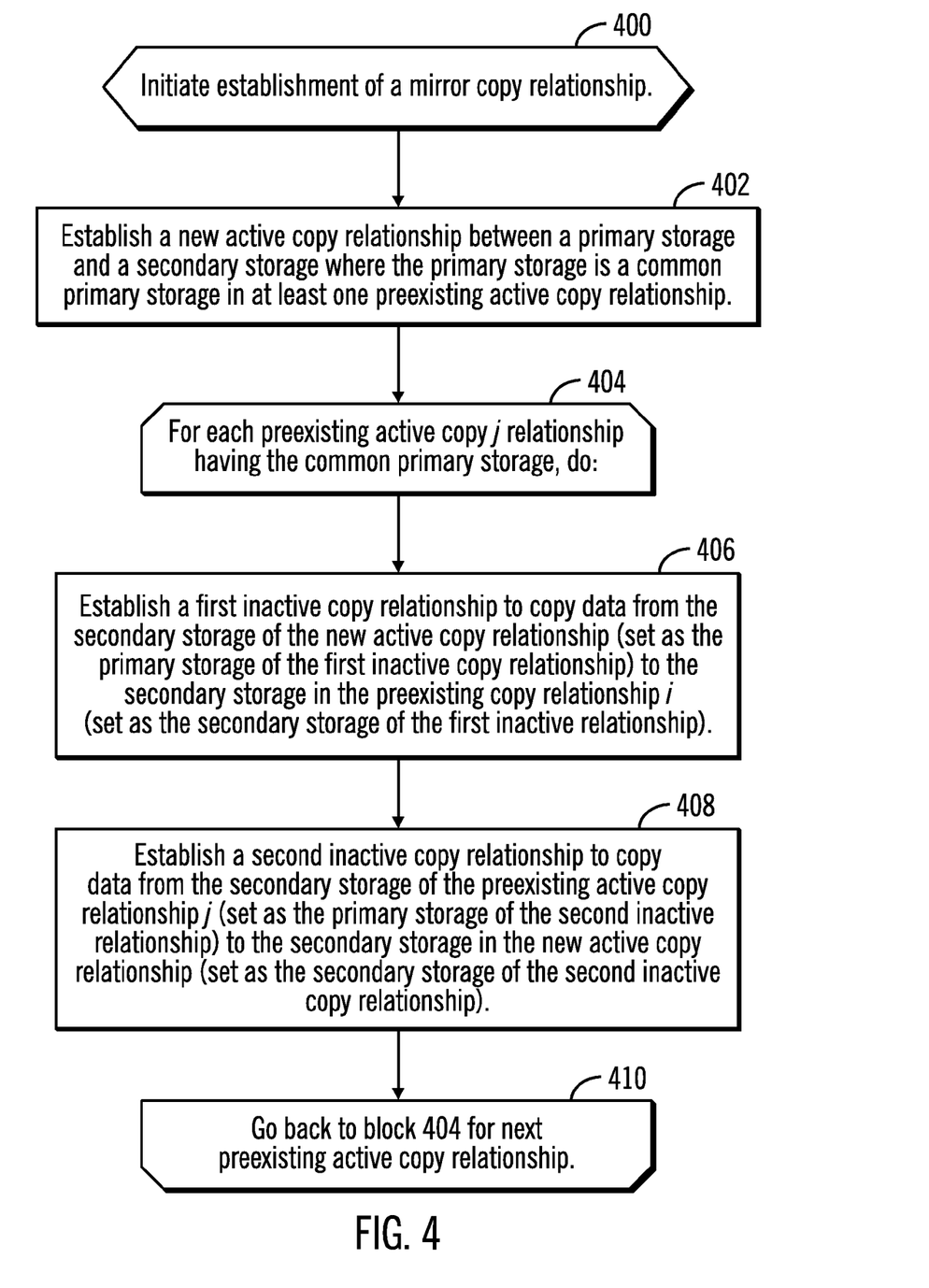
FIG. 4 illustrates an embodiment of operations to establish a mirror copy relationship.

FIG. 4 illustrates an embodiment of operations performed by the replication manager 114, 122 to establish the underlying copy relationships $200_1$, $200_2$. These operations of FIG. 4 may each be initiated in response to user entered establish commands via a user interface of the replication manager 114, 122 or automatically executed as part of a script program including the mirror copy relationship establish commands. Upon initiating (at block 400) the operations to establish a mirror copy relationships $200_i$, the replication manager 114, 122 establishes (at block 402) a new active copy relationship $200_i$ between a primary storage 204 and a secondary storage 206, where the primary storage 206 is a common primary storage in at least one preexisting active copy relationship $200_j$. For each preexisting active copy relationship $200_j$ having the common primary storage 206, the replication manager 114, 122 performs a loop (at blocks 404 through 410) of the operations at blocks 406 and 408. At block 406, the replication manager 114, 122 establishes a first inactive copy relationship $300_m$ to have a primary storage 304 comprising the secondary storage 206 of the new active copy relationship $200_i$ to copy to a secondary storage 306 comprising the secondary storage in the preexisting active copy relationship $200_j$. At block 408, the replication manager 114, 122 establishes a second inactive copy relationship $300_n$ to have a primary storage 304 comprising the secondary storage 206 of the preexisting copy relationship $200_j$ to copy to a secondary storage 306 comprising the secondary storage in the new active copy relationship $200_i$. The second inactive copy relationship $300_n$ comprises a reverse inactive copy relationship of the inactive copy relationship $300_m$ because the primary storage of the reverse relationship $300_n$ is the secondary storage of the other relationship $300_m$, and the secondary storage of the reverse relationship $300_n$ is the primary storage of the other relationship $300_m$. In this way, two inactive copy relationships having the same storages in different primary and secondary positions are the reverse of each other.

With the described embodiments, two inactive copy relationships are created for each pair of possible secondary storages 206 in all the active copy relationships 200 having the common primary storage 204, where the two inactive copy relationships provide a first relationship from a first secondary storage of the pair to the second secondary storage of the pair and a second relationship from the second secondary storage of the pair to the first secondary storage of the pair, so the copy relationships go in both directions for the pair of secondary storages. In this way, an inactive copy relationship is provided for each possible active copy relationship that can be created by failing over to two secondary storages in two active copy relationships $200_1$, $200_2$ in the case the common primary storage fails. The bitmaps 308, 310 for each inactive copy relationship $300_i$ are used to keep track of the data that has changed at the secondary storages of the current active relationship that are the primary and secondary storages of the inactive copy relationship that can be converted in the future to an active relationship. The bitmaps indicate the difference between two possible secondary storages in different active copy relationships having a same common primary storage that could be the subject of a future active copy relationship if the common primary storage fails.

Figure 5:
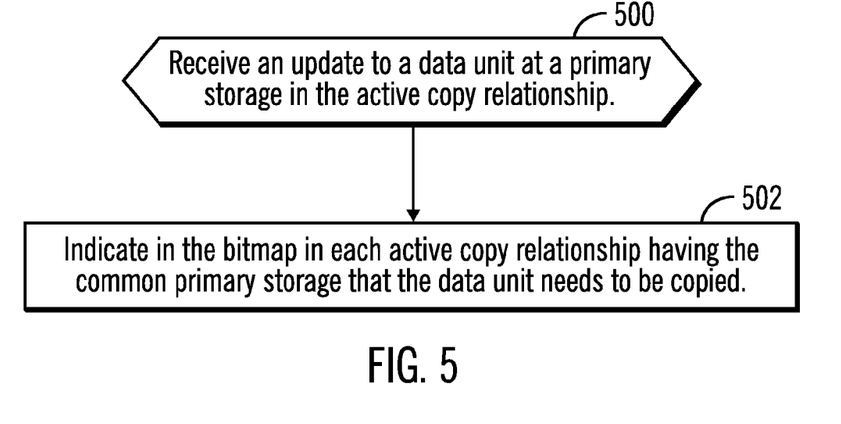
FIGS. 5 and 8 illustrate embodiments of operations to process a write to a data unit to the primary storage in one active copy relationship.

FIG. 5 illustrates an embodiment of operations performed by the replication manager 122 at the storage server 102a including the primary storage 104 to process an update to a data unit at the common primary storage 104 of the active copy relationships 200a. Upon receiving (at block 500) the write to the data unit, the replication manager 122 indicates (at block 502) in the bitmap 212 in each active copy relationship $200_i$ having the common primary storage 204 that the data unit needs to be copied, such as by setting the cell in the bitmap 212 corresponding to the updated data unit to "on" or "1".

Figure 6:
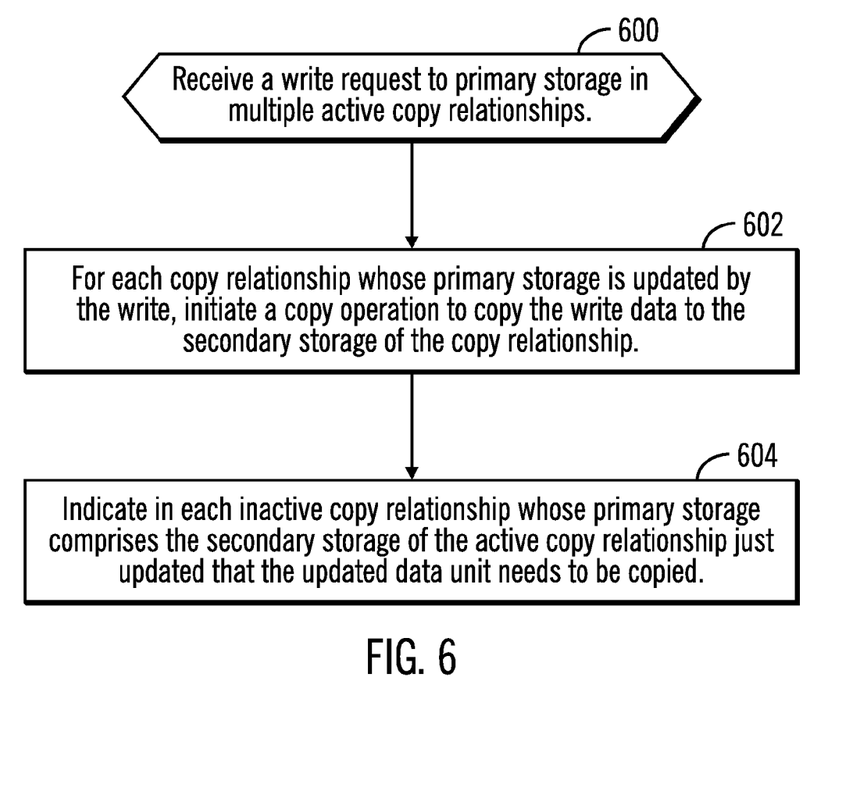
FIGS. 6 and 9 illustrate embodiments of operations to synchronize data for an active copy relationship.

FIG. 6 illustrates an embodiment of operations performed by the replication manager 122 at the storage server 102a including the primary storage 104 to copy a write to the primary storage 204 in multiple active copy relationships $200i$. Upon receiving (at block 600) a write request directed to a primary storage 202 in multiple copy relationships $200_1$, $200_2$, for each copy relationship $200_1$, $200_2$, whose primary storage 202 is updated by the write, the replication manager 122 initiates (at block 602) a copy operation to copy the write data to the identified secondary storage 204 of the copy relationship. The replication manager 122 then indicates (at block 604) in each inactive copy relationship $300_i$ whose primary storage 304 comprises the secondary storage 206 of the active copy relationship $200_i$ just updated that the updated data unit needs to be copied. In one embodiment, the indication the data unit needs to be updated may be made by updating a bitmap data structure, such as the current bitmap 310.

In one embodiment, the replication manager 122 may perform the operation at block 604 by sending a message to the replication manager at each storage sever 102b, 102c including the inactive copy relationships $300_i$ to cause the replication manager at the remote storage severs 102b, 102c to update the bitmaps of their inactive copy relationships, such as their current bitmaps 310 indicating data units that need to be updated in the inactive relationship.

Figure 7:
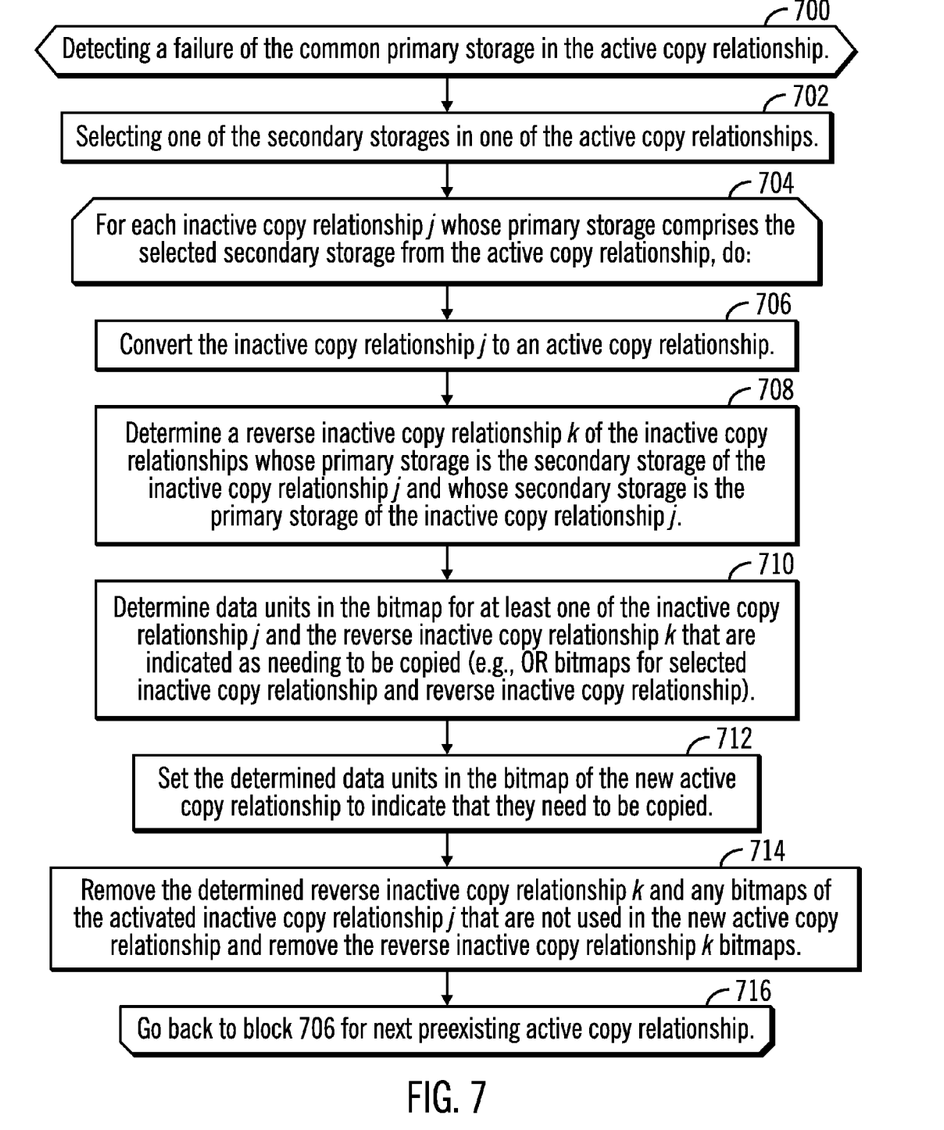

FIG. 7 illustrates an embodiment of operations performed by the failover manager 116 to perform a failover operation when the common primary storage 104 of multiple active copy relationships 200a fails. Upon detecting (at block 700) a failure of the common primary storage 104, the failover manager 116 selects (at block 702) one of the secondary storages 206 in one of the active copy relationships $200_i$ and then performs a loop (at blocks 704 through 716) of operations 706 through 714 for each inactive copy relationship $300_j$ whose primary storage 304 comprises the selected secondary storage 206 from the active copy relationship $200_i$. At block 706, the failover manager 116 or replication manager 114 converts, i.e., activates, the inactive copy relationship $300_j$ to a new active copy relationship 200 having the primary 204 and secondary 206 storages of the inactive copy relationship $300_j$. A reverse inactive copy relationship $300_k$ is determined (at block 708) of the inactive copy relationships 300 whose primary storage 304 is the secondary storage 306 of the inactive copy relationship $300_j$ and whose secondary storage 306 is the primary storage 304 of the inactive copy relationship $300_j$, i.e., the reverse $300_k$ of the inactive copy relationship $300_j$ being considered in the loop. A determination is made (at block 710) of the data units in the bitmap for at least one of the inactive copy relationship $300_j$ and the reverse inactive copy relationship $300_k$ that are indicated as needing to be copied. In one embodiment, the determination at block 710 may be determined by performing a logical OR on the cells of the bitmaps for the inactive copy relationship $300_j$ and the determined reverse inactive copy relationship $300_k$. In embodiments where each inactive copy relationship includes a previous bitmap 308 and current bitmap 310, a logical OR operation may be performed on the cells of all the previous 308 and current 310 bitmaps for the inactive copy relationship $300_j$ and the determined reverse inactive copy relationship $300_k$, which would comprise a logical OR of four bitmaps. A cell or data is determined as needing to be copied if a cell in any of the considered four bitmaps 308, 310 of the inactive $300_j$ and reverse $300_k$ inactive copy relationships is set to a one or "on".

The failover manager 116 may then set (at block 712) the determined data units in the bitmap 212 of the new active copy relationship $200_j$ to indicate that they need to be copied. The bitmap 212 used in the new active copy relationship may comprise the current bitmap 310 of the inactive copy relationship $300_j$ combined, e.g., logical OR'd, with the previous bitmap 308 of the inactive copy relationship $300_j$ and the bitmaps 308 an 310 of the reverse inactive copy relationship $300_k$. The determined reverse inactive copy relationship $300_k$ may then be removed (at block 714), which will also remove, e.g., discard, the bitmaps 308 and 310 of the relationship $300_k$.

With the embodiment of operations in FIG. 7, a new active relationship is established for each secondary storage in the active copy relationships having the failed common primary storage. The inactive copy relationships are used to determine the data units in the new primary storage of the new active relationships that need to be copied over to synchronize the new active copy relationships having the new primary storage, comprising one of the secondary storages of the active copy relationships having the failed common primary storage. In other words, with FIG. 7, new active relationships are established from the secondary storages of the invalid active copy relationships to allow a further failure if the common primary storage in one of the new active copy relationships subsequently fails.

In certain embodiments, if an active copy relationship $200_i$ is terminated, then all inactive copy relationships $300_i$ that include the secondary storage of the terminated active copy relationship are removed.

Figure 8:
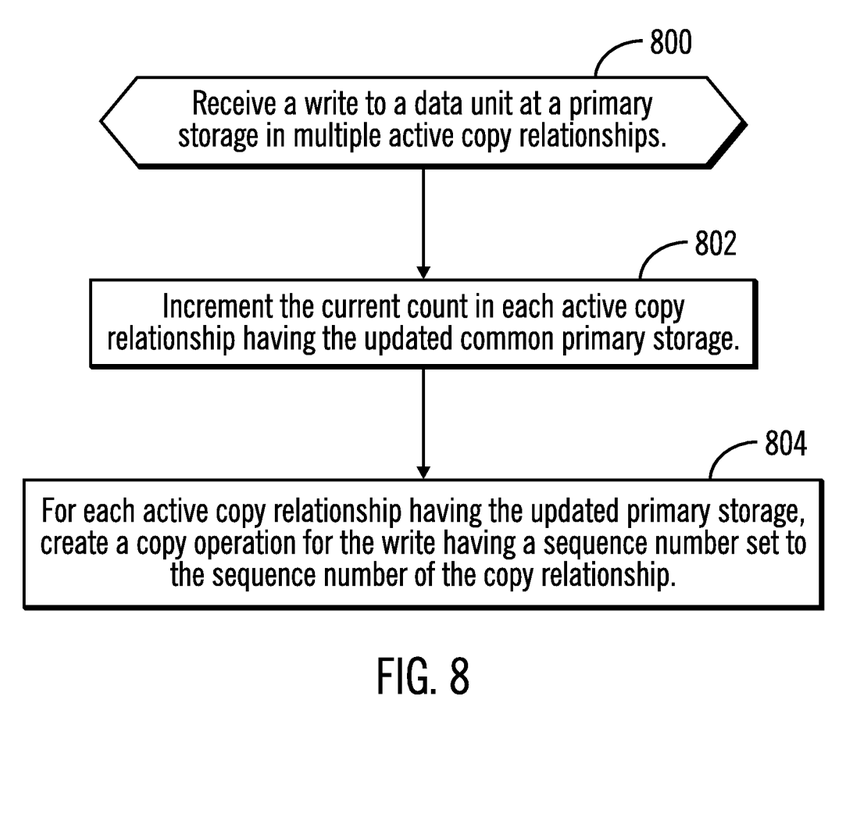

FIG. 8 illustrates an embodiment of operations performed by the replication manager 122 at the storage server 102a including the primary storage 104 to process a write to a data unit at the common primary storage 104 in multiple active copy relationship $200_1$, $200_2$. Upon receiving (at block 800) the write to update the data unit, the replication manager 122 increments (at block 802) the current count 210 for each of the active copy relationship $200_i$ having the updated common primary storage 104 as a primary storage 204. For each active copy relationship having the updated primary storage, the replication manager 122 creates (at block 804) a copy operation for the write request having a sequence number set to the sequence number 214 of the copy relationship $200_i$. In one embodiment, a task control block (TCB) may be generated for the write for each active copy relationship $200_i$ in which the write needs to be copied. The sequence number 214 assigned to the writes would comprise the sequence number associated with the current count 210 of the copy relationship $200_i$ to which the write is assigned. As discussed the sequence number 214 of the copy relationship is set to a value associated with the current count 210 and writes that occurred during the interval associated with the current count. The other possible sequence number value is associated with the previous count 208 and writes receiving during a prior interval associated with the previous count 208.

Figure 9:
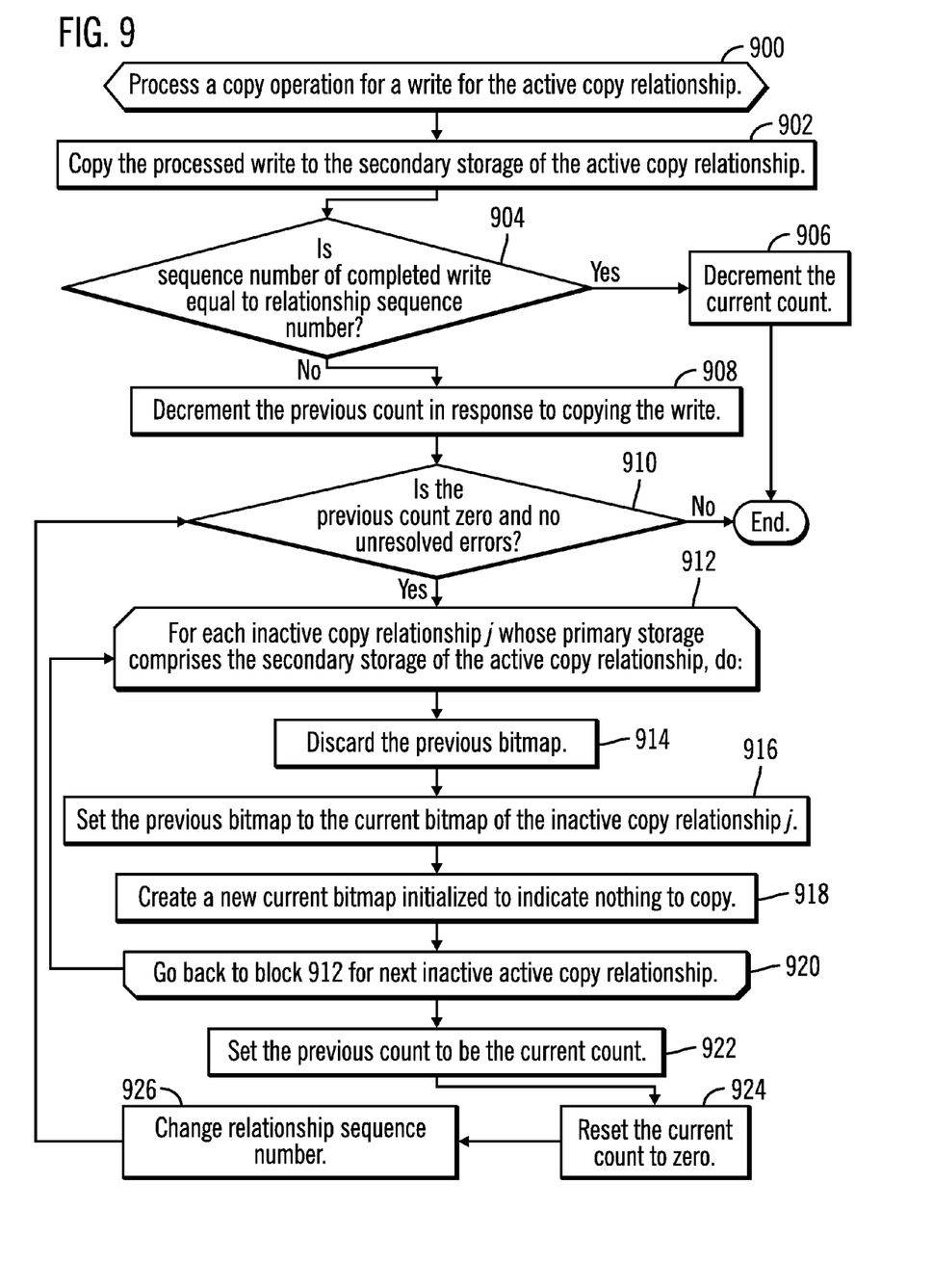

FIG. 9 illustrates an embodiment of operations performed by the replication manager 122 at the storage server 102a including the primary storage 104 to process a copy operation for a write for one of the active copy relationships 200a. Upon initiating (at block 900) the copy operation, the replication manager 122 copies (at block 904) the written data to the secondary storage 206 of the active copy relationship $200_i$. The replication manager 122 determines (at block 904) if the sequence number of the completed write equals the relationship sequence number 214. For instance, if the sequence number of the completed write matches the sequence number of the copy relationship 214, then the write is for the current count 210, i.e., occurred in the previous interval, else if the sequence number is the other possible value, the write is associated with the previous count 208, i.e., occurred in the previous interval. If (at block 904) the completed write sequence number and the relationship sequence number 214 are equal, then the current count 210 is decremented (at block 906). Otherwise, the previous 208 is decremented (at block 908). In one embodiment, the replication manager 122 may use the sequence number for the returned write request to determine the count 208, 210 associated for the write.

If (at block 910) the previous count 208 for the active copy relationship $200_i$ is not zero or there are unresolved errors, such as writes that failed to complete, then control ends. Otherwise, if the previous count 208 is zero and there are no unresolved errors, then a loop (at blocks 912 through 920) of operations at blocks 914 through 918 is performed to toggle the bitmaps 308, 310 for each inactive copy relationship $300_j$ whose primary storage 304 comprises the secondary storage 206 of the active copy relationship $200_i$. At block 914, the previous bitmap 308 for the inactive copy relationship $300_j$ is discarded. The previous bitmap 308 is then set to the current bitmap 310 for the inactive copy relationship $300_j$ and a new current bitmap 310 initialized (at block 918) to indicate nothing to copy, e.g., all zeroes, is allocated. In one embodiment, to set the previous bitmap 308, the previous bitmap 308 may comprise a pointer pointing to the bitmap that comprises the previous bitmap 308. In such case, the bitmaps would be toggled by adjusting the pointer for the previous bitmap 308 to point to the data structure of the current bitmap, and the pointer for the current bitmap 310 would be adjusted to point to a new empty bitmap. After toggling the bitmaps for all the inactive copy relationships $300_j$ (at blocks 912 through 920), the counts 208, 210 for the active copy relationship $200_i$ are toggled by setting (at block 922) the previous count 208 to the current count 210, resetting (at block 924) the current count 210 to zero, and changing (at block 926) the relationship sequence number 214 to the other possible value. From block 926, control proceeds back to block 910 to retoggle the bitmaps and counts if the previous count is still zero.

With the operations of FIG. 9, the inactive copy relationship bitmaps 308, 310 are toggled when the previous count 208 is zero. In one embodiment, the replication manager 122 may toggle the bitmaps 308, 310 of each inactive copy relationship $300_j$ by sending a message to all the replication managers on other storage servers 102b, 102c to have them toggle any inactive copy relationship bitmaps 308, 310 they manage having a primary storage 304 that comprises the secondary storage 206 of the active copy relationship $200_i$ whose previous count 908 has hit zero, indicating that all previous updates occurring before the last toggling, or previous interval, have been synchronized.

If a write to the secondary storage fails, the previous 208 or current 210 count may still be decremented, but first an indicator is set indicating that the write failed so that the bitmap for the active copy relationship stays out of synch. Further, toggling the counts may not be allowed until all failures are cleared and data is copied to the secondary storage, The described embodiments provide techniques to maintain inactive copy relationships between secondary storages of active copy relationships having a common primary storage for use if the common primary storage fails and a failover needs to be performed. Upon failover, new copy relationships may be established for the secondary storages of the active copy relationships having the failed common primary storage. The inactive copy relationships may then be used to determine data to synchronize from the new primary storage to the new secondary storage in a new active copy relationship based on the state of those storages indicated in the inactive copy relationships.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
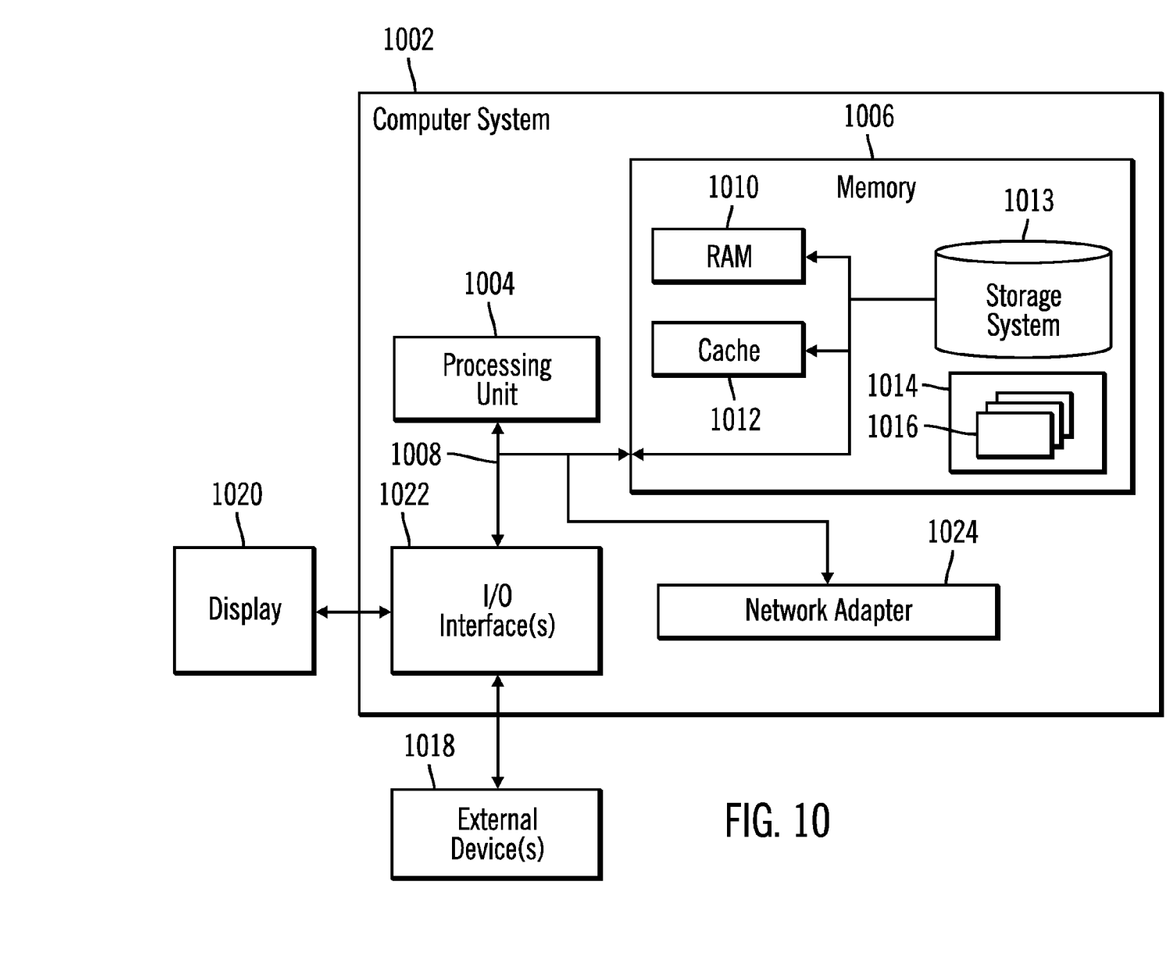
FIG. 10 illustrates a computing environment in which the components of FIG. 1 may be implemented.

The computational components of FIG. 1, including the hosts 100 and storage servers 102a, 102b, 102c may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, k, m, and n, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for copying data in a storage computing environment among a plurality of storages, wherein the computer program product comprises a computer readable storage medium having program instructions embodied therewith, the program instructions executable by a processor to cause operations, the operations comprising:
    establishing a plurality of active copy relationships, each having a common primary storage and one of a plurality of secondary storages comprising one of the storages, to copy data from the common primary storage to the secondary storages in the active copy relationships;
    for a plurality of pairs of the secondary storages in the active copy relationships, establishing at least two inactive copy relationships to copy data from a first secondary storage of the secondary storages in the pair to a second secondary storage of the secondary storages in the pair, wherein each of the inactive copy relationships indicates differences in data between the first and second secondary storages in the inactive copy relationship;
    in response to a failure of the common primary storage in the active copy relationship, establishing a new active copy relationship having a primary and secondary storages comprising the first and the secondary storages from a selected one of the inactive copy relationships; and
    using information in the selected inactive copy relationship to determine data to synchronize for the new active copy relationship.

2. The computer program product of claim 1, wherein the at least two established inactive copy relationships for one of the pairs of the secondary storages comprises a first inactive copy relationship for the pair, and a second inactive copy relationship to copy data from the second secondary storage in the pair to the first secondary storage in the pair.

3. The computer program product of claim 1, wherein the operations further comprise:
    receiving selection of one of the secondary storages in the active copy relationships to be a new primary storage in response to the failure of the common primary storage; and
    establishing one new active copy relationship for each inactive copy relationship whose primary storage comprises the selected secondary storage of the active copy relationship.

4. The computer program product of claim 1, wherein each inactive copy relationship is established in response to adding one active copy relationship from the common primary storage to a new secondary storage, wherein each new inactive copy relationship includes the new secondary storage as one of the primary and secondary storage in combination with one other secondary storage in the active copy relationships.

5. The computer program product of claim 1, wherein a previous count and a current count are associated with each of the active copy relationships, wherein the previous count is associated with a previous interval and the current count is associated with a current interval, wherein the operations for each of the active copy relationships further comprise:
    copying writes from the primary storage to the secondary storage;
    incrementing the current count in response to receiving a write to the primary storage in the active copy relationship;
    decrementing the previous count in response to completing copying the write received in the previous interval;
    decrementing the current count in response to completing copying the write received in the current interval;
    setting the previous count to be the current count in response to the previous count being decremented to zero as a result of copying all the writes to the secondary storage received in the previous interval for the active copy relationship; and
    resetting the current count to zero in response to setting the previous count to the current count.

6. The computer program product of claim 5, wherein the operations further comprise:
    assigning a sequence number to the write that associates the write with the current count;
    using the sequence number assigned to the write that completed copying to determine the previous count or current count of the active copy relationship for which the write was completed copying, wherein the decremented previous or current count comprises the determined previous or current count; and
    changing the sequence number from a first value to a second value in response to the resetting the current count to zero.

7. The computer program product of claim 6, wherein the operations further comprise:
    in response to setting the previous count to the current count when the current count is zero:
        setting the previous count to be the current count;
        resetting the current count to zero in response setting the previous count to the current count; and
        changing the sequence number to one of the first value or the second value that is different from the first or second value currently set for the sequence number in response to the resetting the current count to zero.

8. The computer program product of claim 1, wherein the operations further comprise:
for each inactive copy relationship, generating at least one bitmap indicating data units of the primary storage in the inactive copy relationship that need to be copied to the secondary storage of the inactive copy relationship; and
in response to writing a data unit from the common primary storage to the secondary storage in one of the active copy relationships to synchronize, indicating in one of the at least one bitmap, for each inactive copy relationship whose primary storage comprises the secondary storage of the active copy relationship that was synchronized, that the data unit needs to be copied to the secondary storage of the inactive copy relationship.

9. The computer program product of claim 8, wherein the using of the information in the selected inactive copy relationship to determine data to synchronize for the new active copy relationship comprises using the at least one bitmap for the inactive copy relationship to determine the data to synchronize for the new active copy relationship.

10. The computer program product of claim 9, wherein the establishing the inactive copy relationship to copy data from a first secondary storage in the pairs of the active copy relationships comprises establishing two inactive copy relationships for each of the pairs, wherein a first of the inactive copy relationships is to copy data from the first secondary storage to the second secondary storage of the pair and a second of the inactive copy relationships is to copy data from the second secondary storage to the first secondary storage of the pair, wherein using the at least one bitmap for the inactive copy relationship to determine the data to synchronize for the new active copy relationship comprises:
allocating a new bitmap for the new active copy relationship that indicates data units that need to be copied;
determining a reverse inactive copy relationship of the selected inactive copy relationship whose primary storage is the secondary storage of the selected inactive copy relationship and whose secondary storage is the primary storage of the selected inactive copy relationship;
determining data units in the at least one bitmap for at least one of the selected inactive copy relationship and the reverse inactive copy relationship that are indicated as needing to be copied; and
setting the determined data units in the new bitmap of the new active copy relationship as needing to be copied.

11. The computer program product of claim 10, wherein the operations further comprise:
removing the reverse inactive copy relationships used to set the data units in the new bitmap.

12. The computer program product of claim 1, wherein the operations further comprise:
for each inactive copy relationship, generating a current bitmap and a previous bitmap, each indicating data units of the primary storage in the inactive copy relationship that need to be copied to the secondary storage of the inactive copy relationship; and
in response to writing a data unit from the common primary storage to the secondary storage in one of the active copy relationships to synchronize the secondary storage, indicating in the current bitmap, for each inactive copy relationship whose primary storage comprises the secondary storage of the active copy relationship that was synchronized, that the data unit needs to be copied to the secondary storage of the inactive copy relationship.

13. The computer program product of claim 12, wherein a previous count and a current count are associated with each of the active copy relationships, wherein the operations for each of the active copy relationships further comprise:
incrementing the current count in response to receiving a write to the primary storage in the active copy relationship;
decrementing the previous count or the current count in response to copying the write from the primary storage to the secondary storage in the active copy relationship;
for each inactive copy relationship whose primary storage comprises the secondary storage of the active copy relationship whose previous count was decremented to zero, performing:
discarding the previous bitmap;
setting the previous bitmap to the current bitmap;
creating a new current bitmap initialized to indicate nothing to copy;
setting the previous count decremented to zero to be the current count; and
resetting the current count to zero in response setting the previous count to the current count.

14. The computer program product of claim 1, wherein the operations further comprise:
terminating one of the active copy relationships; and
removing each of the inactive copy relationships including the secondary storage of the terminated active copy relationship.

15. A system for copying data in a storage computing environment among a plurality of storages, comprising:
a processor; and
a computer readable storage medium having program instructions embodied therewith that when executed by the processor to cause operations, the operations comprising:
establishing a plurality of active copy relationships, each having a common primary storage and one of a plurality of secondary storages comprising one of the storages, to copy data from the common primary storage to the plurality of secondary storages in the active copy relationships;
for a plurality of pairs of the secondary storages in the active copy relationships, establishing at least two inactive copy relationships to copy data from a first secondary storage of the secondary storages in the pair to a second secondary storage of the secondary storages in the pair, wherein each of the inactive copy relationships indicates differences in data between the first and second secondary storages in the inactive copy relationship;
in response to a failure of the common primary storage in the active copy relationship, establishing a new active copy relationship having a primary and secondary storages comprising the first and the secondary storages from a selected one of the inactive copy relationships; and
using information in the selected inactive copy relationship to determine data to synchronize for the new active copy relationship.

16. The system of claim 15, wherein the at least two established inactive copy relationship for one of the pairs of the secondary storages comprises a first inactive copy relationship for the pair, and a second inactive copy relationship to copy data from the second secondary storage in the pair to the first secondary storage in the pair.

17. The system of claim 15, wherein a previous count and a current count are associated with each of the active copy relationships, wherein the previous count is associated with a previous interval and the current count is associated with a current interval, wherein the operations for each of the active copy relationships further comprise:
    copying writes from the primary storage to the secondary storage;
    incrementing the current count in response to receiving a write to the primary storage in the active copy relationship;
    decrementing the previous count in response to completing copying the write received in the previous interval;
    decrementing the current count in response to completing copying the write received in the current interval;
    setting the previous count to be the current count in response to the previous count being decremented to zero as a result of copying all the writes to the secondary storage received in the previous interval for the active copy relationship; and
    resetting the current count to zero in response to setting the previous count to the current count.

18. The system of claim 15, further comprising:
    for each inactive copy relationship, generating at least one bitmap indicating data units of the primary storage in the inactive copy relationship that need to be copied to the secondary storage of the inactive copy relationship; and
    in response to writing a data unit from the common primary storage to the secondary storage in one of the active copy relationships to synchronize, indicating in one of the at least one bitmap, for each inactive copy relationship whose primary storage comprises the secondary storage of the active copy relationship that was synchronized, that the data unit needs to be copied to the secondary storage of the inactive copy relationship.

19. The system of claim 18, wherein the using of the information in the selected inactive copy relationship to determine data to synchronize for the new active copy relationship comprises using the at least one bitmap for the inactive copy relationship to determine the data to synchronize for the new active copy relationship.

20. The system of claim 15, further comprising:
    for each inactive copy relationship, generating a current bitmap and a previous bitmap, each indicating data units of the primary storage in the inactive copy relationship that need to be copied to the secondary storage of the inactive copy relationship; and
    in response to writing a data unit from the common primary storage to the secondary storage in one of the active copy relationships to synchronize the secondary storage, indicating in the current bitmap, for each inactive copy relationship whose primary storage comprises the secondary storage of the active copy relationship that was synchronized, that the data unit needs to be copied to the secondary storage of the inactive copy relationship.

21. A method for copying data in a storage computing environment among a plurality of storages, comprising:
    establishing a plurality of active copy relationships, each having a common primary storage and one of a plurality of secondary storages comprising one of storages, to copy data from the common primary storage to the secondary storages in the active copy relationships;
    for a plurality of pairs of the secondary storages in the active copy relationships, establishing at least two inactive copy relationships to copy data from a first secondary storage of the secondary storages in the pair to a second secondary storage of the secondary storages in the pair, wherein each of the inactive copy relationships indicates differences in data between the first and second secondary storages in the inactive copy relationship;
    in response to a failure of the common primary storage in the active copy relationship, establishing a new active copy relationship having a primary and secondary storages comprising the first and the secondary storages from a selected one of the inactive copy relationships; and
    using information in the selected inactive copy relationship to determine data to synchronize for the new active copy relationship.

22. The method of claim 21, wherein the at least two established inactive copy relationships for at least one of the pairs of the secondary storages comprises a first inactive copy relationship for the pair and a second inactive copy relationship to copy data from the second secondary storage in the pair to the first secondary storage the pair.

23. The method of claim 21, wherein a previous count and a current count are associated with each of the active copy relationships, wherein the previous count is associated with a previous interval and the current count is associated with a current interval, wherein for each of the active copy relationships further performing:
    copying writes from the primary storage to the secondary storage;
    incrementing the current count in response to receiving a write to the primary storage in the active copy relationship;
    decrementing the previous count in response to completing copying the write received in the previous interval;
    decrementing the current count in response to completing copying the write received in the current interval;
    setting the previous count to be the current count in response to the previous count being decremented to zero as a result of copying all the writes to the secondary storage received in the previous interval for the active copy relationship; and
    resetting the current count to zero in response to setting the previous count to the current count.

24. The method of claim 21, further comprising:
    for each inactive copy relationship, generating at least one bitmap indicating data units of the primary storage in the inactive copy relationship that need to be copied to the secondary storage of the inactive copy relationship; and
    in response to writing a data unit from the common primary storage to the secondary storage in one of the active copy relationships to synchronize, indicating in one of the at least one bitmap, for each inactive copy relationship whose primary storage comprises the secondary storage of the active copy relationship that was synchronized, that the data unit needs to be copied to the secondary storage of the inactive copy relationship.

25. The method of claim 24, wherein the using of the information in the selected inactive copy relationship to determine data to synchronize for the new active copy relationship comprises using the at least one bitmap for the inactive copy relationship to determine the data to synchronize for the new active copy relationship.

26. The method of claim 21, further comprising:
    for each inactive copy relationship, generating a current bitmap and a previous bitmap, each indicating data units of the primary storage in the inactive copy relationship that need to be copied to the secondary storage of the inactive copy relationship; and in response to writing a data unit from the common primary storage to the secondary storage in one of the active copy relationships to synchronize the secondary storage, indicating in the current bitmap, for each inactive copy relationship whose primary storage comprises the secondary storage of the active copy relationship that was synchronized, that the data unit needs to be copied to the secondary storage of the inactive copy relationship.

* * * * *